(12) United States Patent
Nielsen

(10) Patent No.: US 7,767,094 B2
(45) Date of Patent: Aug. 3, 2010

(54) METHOD AND APPARATUS FOR COLLECTING AND/OR SEPARATING SOLIDS FROM LIQUIDS

(75) Inventor: Ian Bradley Nielsen, Kingscliff (AU)

(73) Assignee: Ultra Aquatic Technology Pty Ltd, Kingscliff, New South Wales (AU)

( * ) Notice: Subject to any disclaimer, the term of this patent is extended or adjusted under 35 U.S.C. 154(b) by 1124 days.

(21) Appl. No.: 10/572,822

(22) PCT Filed: Sep. 21, 2004

(86) PCT No.: PCT/AU2004/001282

§ 371 (c)(1),
(2), (4) Date: Apr. 17, 2006

(87) PCT Pub. No.: WO2005/028069

PCT Pub. Date: Mar. 31, 2005

(65) Prior Publication Data

US 2009/0001030 A1    Jan. 1, 2009

(30) Foreign Application Priority Data

Sep. 22, 2003    (AU) .............................. 2003905127

(51) Int. Cl.
*B01D 21/24* (2006.01)
(52) U.S. Cl. .................. 210/747; 210/803; 210/170.04; 210/242.1; 210/527; 15/1.7; 37/321
(58) Field of Classification Search ................ 210/747, 210/803, 170.04, 170.09, 170.11, 242.1, 210/258, 523, 527; 15/1.7; 37/317, 320, 37/321

See application file for complete search history.

(56) References Cited

U.S. PATENT DOCUMENTS

| 491,843 | A | * | 2/1893 | Kauser .......................... 37/321 |
|---|---|---|---|---|
| 1,415,113 | A | * | 5/1922 | Phillips ......................... 37/321 |
| 2,646,889 | A | * | 7/1953 | Dulak ............................ 15/1.7 |
| 3,245,420 | A | * | 4/1966 | Cherney ......................... 15/1.7 |
| 3,396,102 | A | * | 8/1968 | Forrest ......................... 210/527 |
| 3,797,664 | A | * | 3/1974 | Pentz et al. .................. 210/527 |
| 3,967,393 | A | * | 7/1976 | Nixon .......................... 37/321 |
| 4,111,809 | A | * | 9/1978 | Pichon ...................... 210/242.1 |
| 4,152,800 | A | * | 5/1979 | Nilsmar ......................... 15/1.7 |
| 4,190,541 | A | * | 2/1980 | Wade et al. .................. 210/527 |
| 5,198,125 | A | * | 3/1993 | Coudriet et al. ............. 210/803 |
| 5,584,993 | A | * | 12/1996 | Van Der Schrieck ... 210/170.04 |
| 6,199,237 | B1 | | 3/2001 | Budden |
| 2003/0062319 | A1 | * | 4/2003 | Keller et al. ................. 210/747 |
| 2004/0158943 | A1 | | 8/2004 | Popielarczyk |

* cited by examiner

*Primary Examiner*—Christopher Upton
(74) *Attorney, Agent, or Firm*—Shoemaker and Mattare

(57) ABSTRACT

Apparatus (10) for collecting solids selling on the bottom of a liquid reservoir and/or floating solids, the apparatus (10) having a hollow suction head (23) and at least one outlet duct (26) extending from the suction head (23). Air can be supplied to the suction head (23) to create a suction pressure in the suction head (23) to cause settling solids beneath the suction head (23) to pass along the outlet duct or ducts (26). The suction head (23) may be connected to a collector (11) which is provided with a float (21) to support the collector (11) at the surface of the liquid, and the outlet duct or ducts (26) are connected to the collector (11) which collects the solids. The collector (11) may also have an inlet to collect floating solids.

20 Claims, 8 Drawing Sheets

METHOD AND APPARATUS FOR COLLECTING AND/OR SEPARATING SOLIDS FROM LIQUIDS

TECHNICAL FIELD

This invention relates to a method and apparatus for collecting and/or separating solids from liquids. The present invention in a further aspect relates to a method and apparatus for collecting solids such as sludge settling in a liquid. In a further aspect, the present invention relates to a method of apparatus for separating of floating solids as well as surface scum from liquids.

BACKGROUND ART

In many situations it is either desirable or necessary to separate solids or other materials from liquids. For example, in aquaculture ponds, there tends to be, over a period of time, an increase in solid matter in the pond water which may be undigested food, excrement from fish or crustaceans being grown in the ponds or any other form of organic and inorganic solid material. As a result of the build up of this solid matter, it is necessary to empty the pond at regular intervals usually at harvest time which creates an environmental problem in liquid disposal. Further heavy machinery is usually required to be used at considerable cost to remove and spread the solid matter which has settled as sludge on the base of the pond. The pond is then required to be refilled necessitating use of a large quantity of water. Where the aquaculture system uses fresh water, refilling of the pond provides a drain on natural resources and therefore is becoming environmentally unacceptable. It would be advantageous therefore to reduce the frequency at which changing the pond water in aquaculture systems is undertaken. It would also be advantageous to remove or contain the sludge in the effluent water from agricultural ponds to reduce the effects of solids discharge into the natural waterways and contain and/or remove the sludge or solid wastes from with the pond prior to discharge.

SUMMARY OF THE INVENTION

The present invention aims to provide in one aspect a method and apparatus for collecting solids in liquids and in one particular aspect to a method and apparatus for collecting sludge or solids settling in liquids. In another aspect, the present invention aims to provide a method and apparatus which is particularly but not exclusively suited for application to the separation of solids from liquids in which the solids are floating or suspended in liquid. The present invention in a further particular aspect aims to provide a method and apparatus for cleaning ponds such as aquaculture ponds, settling ponds or the like. Other objects and advantages of the invention will become apparent from the following description.

Reference to "solids" in description and claims includes solids or other materials which are entrained in liquids including coarse, fine, suspended and settleable solids, and solids or other materials floating on liquids or other gross pollutants as well as scum, foam or other organic or inorganic pollutants at the surface of a liquid.

The present invention thus provides in one aspect provides, apparatus for collecting solids settling at the bottom of a liquid reservoir, said apparatus comprising a hollow suction head, at least one outlet duct extending from said hollow suction head, and means for creating a suction pressure in said suction head whereby to cause settling solids beneath said suction head to pass along said at least one outlet duct for collection.

The suction head suitably comprises a hollow body which has an open lower side defining a mouth. The upper side of the body is suitably provided with the one or more outlets for connection to the outlet duct or ducts. The hollow body may be of elongated form and the at least one outlet comprises an outlet spigot to which an outlet duct may be connected. Preferably a series of outlets are provided at spaced positions longitudinally along the body, each outlet suitably comprises an outlet spigot. The hollow body may be of domed form Preferably the means for creating a suction pressure in the suction head comprises means for introducing air into the suction head. The means for introducing air into the suction head suitably comprises an air supply. Preferably an air diffuser is located within the suction head and is connectable to the supply of air. The air diffuser suitably comprises an elongated pipe which preferably suitably includes a plurality of air outlets. Preferably the elongated pipe extends longitudinally of the body. The air diffuser pipe may projection through one or opposite ends of the body for connection to the air supply. Air introduced into the suction head will cause through the engineering principles of air lift pumping, liquid and solids entrained within the liquid to pass along the at least one outlet duct.

The suction head may include means to displace solids from the bottom of the liquid reservoir. The displacing means may comprise a brush. The brush may extend around the mouth of the body of the suction head. Alternatively, the displacing means may comprise prongs or tynes or water or air jet pressure.

The suction head assembly may be supported for movement over the bottom of the liquid reservoir by supports which suitably support the suction head assembly in a substantially horizontal attitude. The supports may comprise skids provided at opposite ends of the suction head assembly.

The collecting apparatus is suitably associated with a collector for collecting materials from the suction head assembly to form a sludge harvester. The collector preferably includes a collection chamber and buoyant support means for supporting the collection chamber adjacent to the surface of liquid in which the harvester is operating. The chamber may have at least one entry port whereby liquid and entrained solids from the suction head can flow into the chamber for collection. The at least one outlet duct is suitably connected to the entry port. Suitably the at least one outlet duct is connected to the entry port through a manifold. The chamber is preferably circular in plan view and means are suitably provided for directing liquids and entrained solids in a generally tangential direction into the chamber. The chamber suitably comprises a housing including a side wall and the at least one entry port is formed in the side wall. The means for directing liquid into the housing may include a guide member or scoop extending from the entry port. The guide member suitably extends from one end of the entry port.

The housing suitably has a sump on its lower side in which solids passing into the housing may collect. The housing suitably is in a generally cylindrical configuration but may have a frustoconical configuration with the side wall inclined inwardly from the upper end. A pump such as a sludge pump may be used to pump solids collecting in the sump away from the housing. The sludge pump or an inlet to a sludge pumping device may be permanently or temporarily positioned in the sump.

The buoyant support means may comprise a buoyancy member located around at least portion of the upper periphery of the housing. The member may define an elongated hollow chamber which may be sealed to define one or more air reservoirs. Alternatively or additionally a plurality of buoyant bodies such as foam plastics bodies may be located in the hollow chamber. The hollow chamber may be circular or rectangular in cross section and the buoyant bodies may be tubular bodies for neat receipt in the hollow chamber. In a further alternative arrangement, a buoyant foam plastics material may be injected into the hollow chamber.

The buoyant support means however may comprise any form of buoyant body or bodies which will support the housing at or adjacent the surface of liquid in which the apparatus is located. For example the buoyant support means may comprise a foam filled plastic moulded housing or housings. The buoyant body or bodies may be arranged at spaced locations around the housing and fixedly or detachably mounted thereto.

Preferably, link means interconnect the suction head and the collector. The link means suitably permits the height of the suction head to be adjusted relative to said collector. The link means may comprise a pair of link arms which are provided at opposite ends of the suction head and which extend substantially parallel to each other to allow the collector and suction head to be moved in parallelism relative to each other. The link arms are preferably pivotally connected at each end to the suction head and collector respectively.

Where the collector is also configured to collect solids floating in or on the surface of the liquid, a further external guide member suitably extends from the other end of the entry port. The guide members may define a throat to assist in direction liquid into the housing of the collector. The housing also suitably includes one or more outlet ports or openings spaced from the entry port for passage of liquid out of the housing.

The apparatus may also be configured for collecting solids floating in or on or adjacent the surface of the liquid and for this purpose the entry port is open to collect such materials. In this configuration, means may be provided for mooring or locating the apparatus in a desired position on a body of liquid. The locating means may include an aperture on the collector through which a stake or the like may be driven.

Means may be provided for assisting in guiding liquid and materials in the liquid towards the entry port of the collector. Such means may include guide or deflector arms which extend outwardly of the collector housing. The guide arms may comprise floating boom arms which may be angled as desired relative to the collector. A series of interconnected guide arms may be provided to guide liquid flow towards the collector. The guide arms may be arranged in any configuration.

The at least one outlet duct from the suction head may simply extend at their upper ends into the collector whereby the collector may collect and concentrate materials from the bottom of the liquid reservoir and also simultaneously collect solids in or adjacent the surface of the liquid.

The apparatus in either configuration may also include means for facilitating interconnection with a further like apparatus whereby a number of apparatuses may be arranged in an array to improve the efficiency of collection. Such means may comprise arms extending from the collector housing, suitably radially from the housing and means may be provided for releasably coupling one or more arms of one housing to one or more arms of an adjacent housing.

Any suitable means may be provided for moving the apparatus in the body of liquid in which it is operating. Such means may comprise a winching system comprising a winch having a cable coupled to the suction head to move the suction head and attached collector in the liquid reservoir. Alternatively, the cable of the winch can be attached to the collector. Means may be provided for automatically reversing the winch for example where the apparatus is approaching a bank of the liquid reservoir. The reversing means may cause the apparatus to traverse back and forwards over the bottom of the liquid reservoir. The automatic reversing means may include means associated with the coupling cable. The automatic reversing means may include one or more limit switches which may be actuated by one or more stop means on the cable.

The present invention in a further aspect provides a method of cleaning a liquid reservoir, said method including the steps of providing apparatus of the above described type, and moving said apparatus in said reservoir for collection of solids settling on the bottom of said reservoir and/or solids floating on or located adjacent the surface of liquid in said reservoir. Preferably the method includes the step of collecting settling and floating solids simultaneously.

BRIEF DESCRIPTION OF THE DRAWINGS

In order that the invention may be more readily understood and put into practical effect, reference will now be made to the accompanying drawings which illustrate preferred embodiments of the invention and wherein.

DETAILED DESCRIPTION OF THE PREFERRED EMBODIMENT

Figure 1:
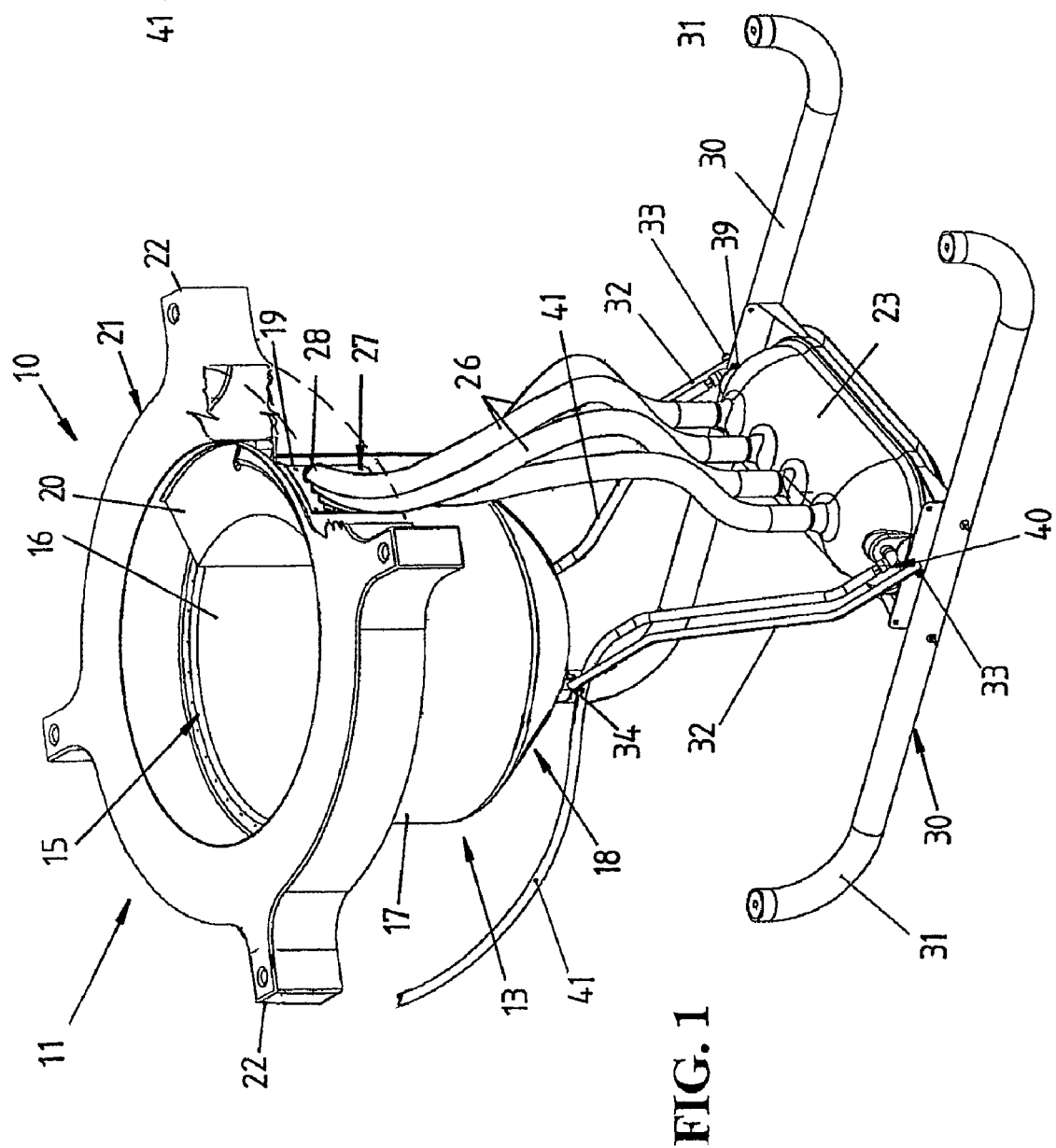
FIG. 1 is a perspective view of a sludge harvester according to first aspect of the invention showing the flotation collar partly cut away.
Figure 4:
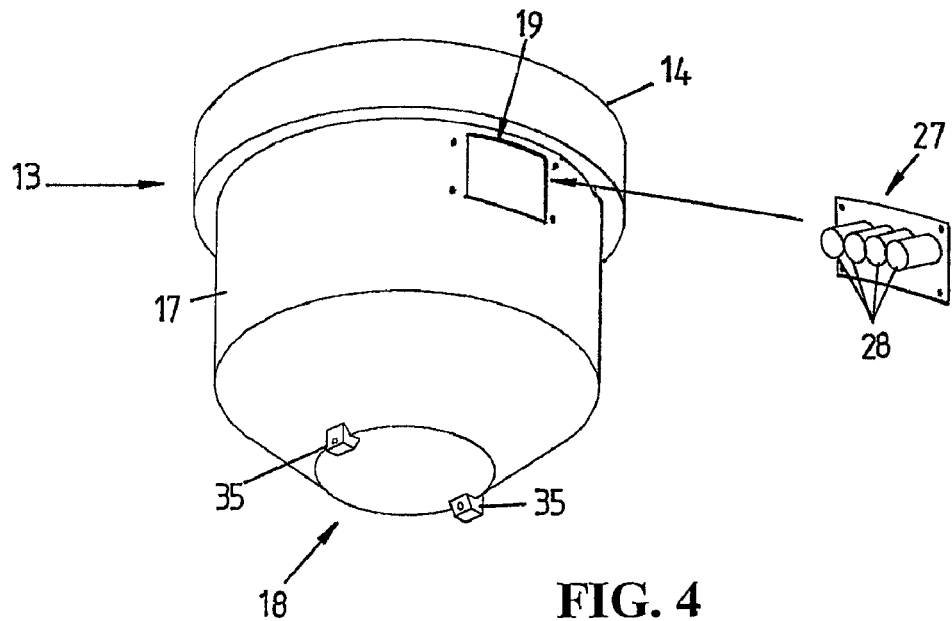
FIG. 4 is an underside view of the housing of the floating collector and associated inlet manifold.
Figure 5:
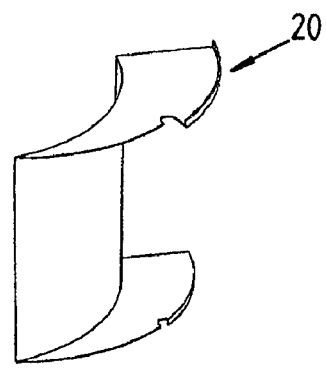
FIG. 5 illustrates a flow guide for use with the collector.

Referring firstly to FIG. 1, there is illustrated a sludge harvester 10 according to an embodiment of the invention for removing algae, sludge or other material settling on the floor of a liquid reservoir such as an aquaculture pond or settling pond. The sludge harvester 10 includes a floating collector 11 associated with a suction head assembly 12. The collector 11 as also shown in FIG. 4 comprises a main housing or vessel 13 which is provided with a stiffening collar 14 around its upper periphery and which defines an internal collection chamber 15. The housing or vessel 13 in this embodiment is of a substantially circular configuration in plan view and has an open upper side 16 and an outer cylindrical side wall 17 which extends upwardly from a lower frustoconical sump 18. A liquid entry port 19 is formed in the side wall 17, the entry port 19 in this embodiment being of elongated rectangular configuration extending in a generally circumferential direction around the wall 17. A guide member 20 (see also FIG. 5) is provided in the chamber 15 and defines with the side wall 17 of the vessel 13 a passage which extends partially around to wall 17 to assist in guiding liquids flowing into the housing 13 through the port 19 in a circular direction around the interior of the housing 13.

Figure 3:
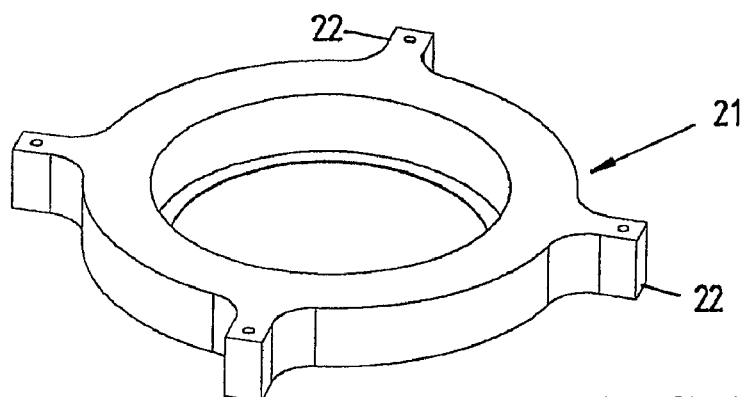
FIG. 3 is a view from the top of the flotation collar of the floating collector of the harvester.

To enable the housing 13 to float on or adjacent the surface of liquid in which it is operating and in which solids are to be collected, an annular hollow float member 21 as shown more clearly in FIG. 3 is connected to the upper rim of the housing 13 such as to encircle the upper open side 16 of the housing 13. The float member 21 serves as an air reservoir and for this purpose is sealed to contain air and act as a float. Alternatively, one or more buoyant bodies such as foam plastics members or inserts such as members or inserts of tubular configuration may be located in the hollow float member 21. In an alternative arrangement, a buoyant foam plastics material may be injected into the hollow float members 21. The buoyant support provided by the float member 21 will support the housing 13 in a substantially horizontal attitude at or adjacent the surface of the liquid and with the central axis of the housing 13 substantially vertical. The hollow float member 21 is provided with circumferentially spaced radially extending apertured lugs 22 to enable anchoring of the sludge harvester 10, or connection with a further collector 11 as described further below. The float member 21 is typically formed of plastics materials with the lugs 22 formed integrally.

Figure 7:
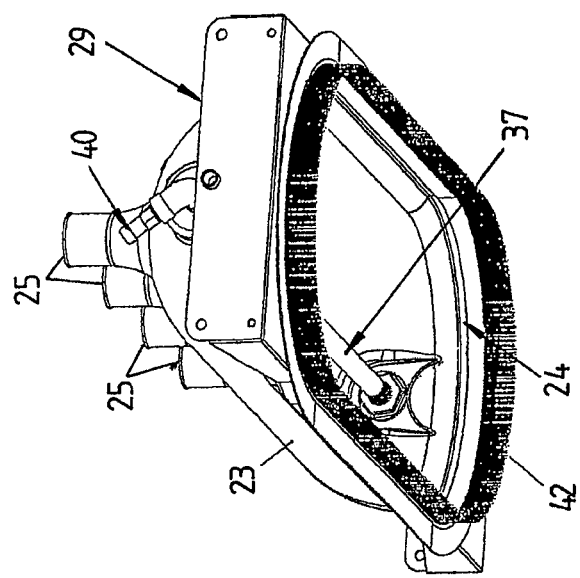
FIG. 7 is a perspective view from the underside of the suction head assembly of FIG. 6.
Figure 6:
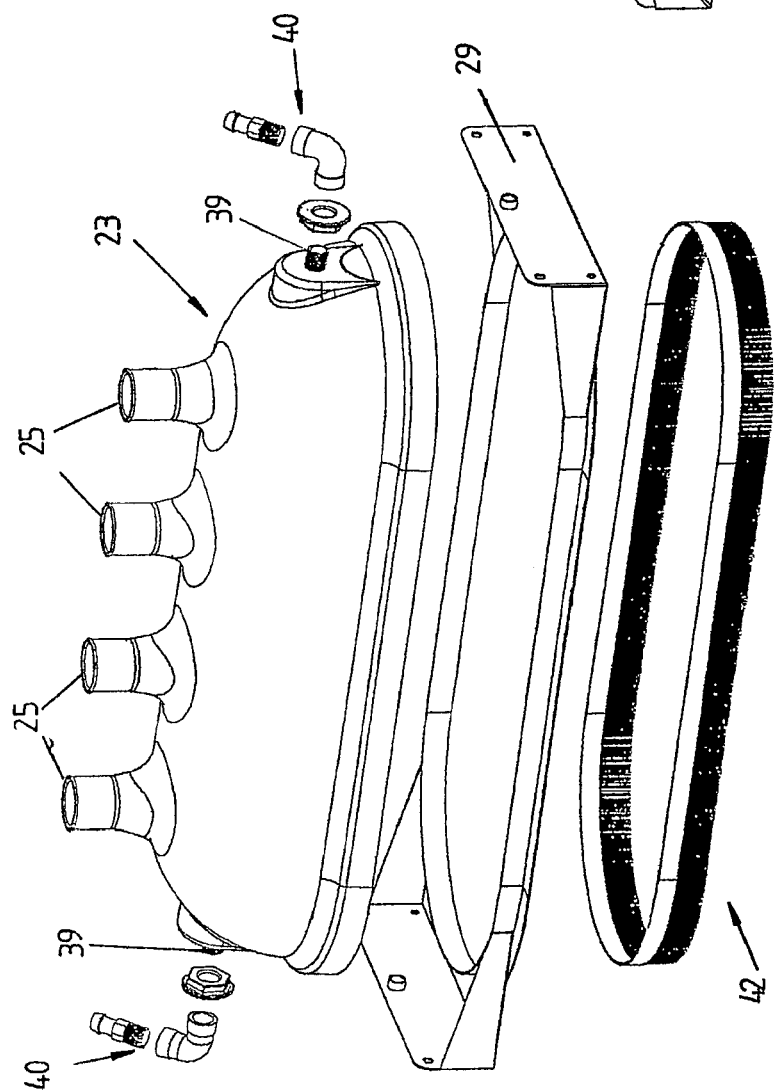
FIG. 6 is an exploded view of the suction head assembly of the sludge harvester of FIG. 1.

The suction head assembly 12 includes a hollow elongated domed suction head 23 (see also FIGS. 6 and 7) which has an open mouth 24 on its lower side and which on its upper side is provided with a series of hollow connecting spigots 25 which communicate with the interior of the suction head 23 and which are provided for connection to the lower ends of uptake tubes 26 which at their upper ends are connected with the entry port 19 of the floating collector 11. For this purpose, a manifold 27 is secured to the intake port 15, the manifold 27 having a series of horizontally spaced spigots 28 to which the opposite upper ends of the tubes 26 are connected. The spigots 28 are arranged in a generally tangential direction relative to the housing 11 so that liquid passing along the tubes 24 flows along the passage defined by the guide member 20 and is guided initially tangentially and then in a circular direction in the chamber 15.

Figure 2:
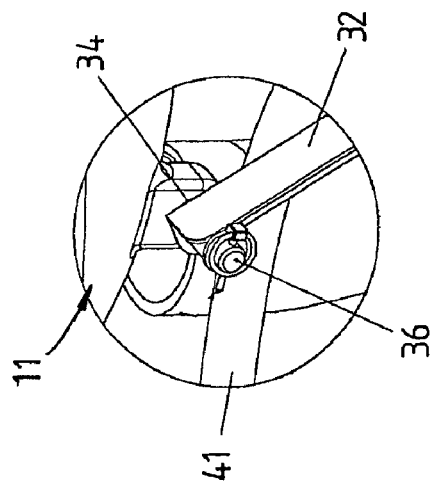
FIG. 2 is an enlarged view of the region A of FIG. 1.

The suction head 23 is mounted on a support frame 29 which is secured at opposite ends to skid arms 30 which are of tubular form and curved upwardly at their opposite ends 31 and which support the suction head 23 for movement over the reservoir floor. Opposite substantially parallel link arms 32 provided at opposite ends of the suction head 23 are pivotally connected at one end at 33 to the frame 29 and at their opposite ends at 34 to the floating collector 11. For the latter purpose, the collector 11 is provided with a pair of opposite downwardly extending lugs 35 extending from the sump 18 to which the arms 32 are connected by hinge pins 36 as shown more clearly in FIG. 2. The connection provided by the link arms 32 is such that the suction head assembly 12 can move with the floating collector 11 with the pivotal link arms 32 permitting movement of the floating collector 11 and suction head assembly 12 relative to each other for example where the surface on which the suction head assembly 12 is operating is undulating or at different depths relative to the surface of liquid on which the collector 11 is floating.

Figure 8:
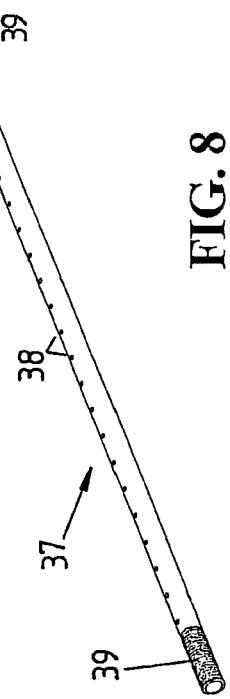
FIG. 8 illustrates the air diffuser used in the suction head.

An elongated air diffuser pipe 37 (see FIGS. 7 and 8) having a plurality of apertures 38 therein is provided within the suction head 23 to extend longitudinally thereof. The diffuser pipe 37 is threaded at opposite ends 39 and the opposite ends 39 extend through opposite openings in the suction head 23 for connection at one or both ends via connectors 40 to air supply tubes 41. The air supply tube or tubes 41 are coupled to air compressors or blowers which may be shore mounted as described further below. Alternatively, the air supply tube or tubes 41 may be connected to air compressors or blowers supported on the collector 11.

An annular brush 42 may also be provided around the mouth 24 of the suction head 23 to assist in displacing and containing materials to be collected by the suction head 23, the brush 42 being mounted to the frame 29. The brush 42 alternatively may be replaced by a skirt, preferably a flexible skirt which extends around the mouth 24 of the suction head 23 to improve the suction effect. The brush 42 alternatively may be replaced by a series of fingers or prongs to assist is displacing material from the surface of the pond or the like in which the apparatus 10 is operating. Alternatively, a series of jet nozzles may be provided around the mouth 24 of the suction head through which water or air may be forced to displace the materials to be collected by the suction head 23.

In use, air is supplied to the air supply tubes 41 by the air compressor or blower which thus passes into the diffuser pipe 37 to pass out through apertures 38 as air bubbles into the head 23 to pass upwardly along the uptake tubes 26. This will create a back or suction pressure within the head 23 and serve as an air lift to draw liquid and entrained solids into the spigots 25 for passage upwardly through the tubes 26 to pass into the manifold 27 and into the port 19 and thus into the chamber 15 of the collector 11 where solids collect and are concentrated.

Figure 9:
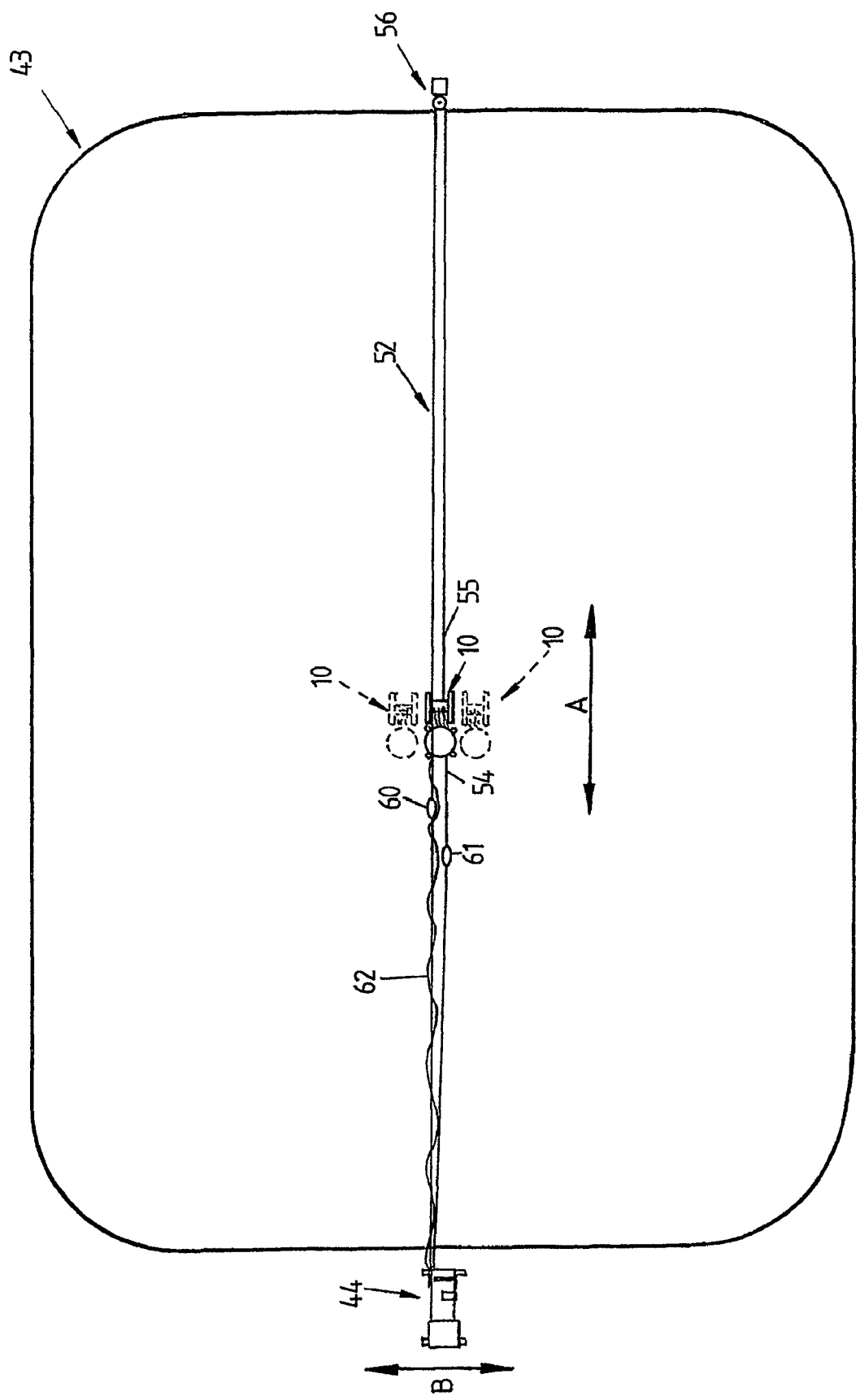
FIG. 9 illustrates the manner of use of the sludge harvester in a sludge collection system of an aquaculture pond.

The sludge harvester 10 comprising the floating chamber 11 with attached suction head assembly 12 is most suitably used by being moved around the body of liquid in which it is operating. A typical arrangement for operating the sludge harvester 10 in a settling pond 43 is illustrated in FIG. 9. In this arrangement, a winch 44 (shown in FIG. 11) is provided on one bank of the pond 43 either fixedly mounted or mounted for movement along the bank. The winch 44 is mounted on a chassis 45 and includes a winch wheel 46 connected through a gear and sprocket (or a belt and pulley) transmission 47 to an electric drive motor 48. The chassis 45 also carries an air blower 49 for supply of air to the air supply lines 41 which supply the suction head 23 and a switch board 50 for controlling supply of current to the air blower 49 and the electric drive motor 48 of the winch 44.

Current is supplied to the drive motor 48 of the winch 44 through a direction switch assembly 51 which controls the direction of supply of current to the motor 48 and thus the direction of operation of the winch 44. A cable 52 passes around the winch wheel 46 and through upper and lower guides 53 and has one end 54 coupled to the suction head assembly 12 typically by means of a bridle. The other end 55 of the cable 52 passes above water and is guided over the floating collector 11 and passes around a pulley block 56 and is connected back to the opposite side of the suction head assembly 12.

The direction switch assembly 51 includes a pair of spaced apart limit switches 57 and 58 which are mounted via a support bracket 59 on the chassis 45, the support bracket 59 also carrying the guides 53. The cable 52 carries a pair of floats or stops 60 and 61 which can engage the limit switches 57 and 58 to reverse the direction of rotation of the winch wheel 46. The floats or stops 60 and 61 may be adjusted along the cable 52 to vary the position of reversing movement of the sludge harvester 10. A flexible air supply line 62 is connected between the blower 49 and air supply lines 41 to the suction head 23 and may be supported on one run of the cable 52. Alternatively, the air supply line 62 may simply float on the liquid surface.

In use when the winch 44 is operated, the sludge harvester 10 is moved across the floor of the pond 43 whilst at the same time air is supplied to the suction head 23. As the suction head 23 is moved along the floor of the pond, sludge will be drawn upwardly along the uptake pipes 26 under the influence of the air supplied to the air diffuser pipe 37 to collect within the collector chamber 15 where it is concentrated. As the sludge harvester 10 approaches one end of the pond 43, one stop or float for example the stop or float 60 will contact the limit switch 57 to reverse the direction of operation of the winch 44 and thus the direction of movement of the harvester 10. When the harvester 10 approaches the opposite end of the pond 43 or the pulley 56, the other stop or float 61 is positioned on the cable 52 to contact the other limit switch 58 to again reverse the direction of operation of the winch 44. The harvester 10 may thus traverse over the bottom of the pond 43 in opposite directions.

At regular intervals, the sludge harvester 10 may be moved to a bank of the pond 43 to allow removal of the sludge and other solids or materials concentrating in the collector chamber 15. Alternatively, a submergible pump may be placed within the chamber 15 to pump the collected sludge to the bank of the pond 43 for disposal.

The winch 44 may be moved along the bank in the opposite directions B and the pulley block 56 on the opposite bank or in another position in the pond 43 additionally or alternatively moved to allow other areas of the pond floor to be dredged. For this purpose, the winch chassis 45 may be mounted on a mobile carriage and the pulley block 56 may be similarly mounted.

Figure 10:
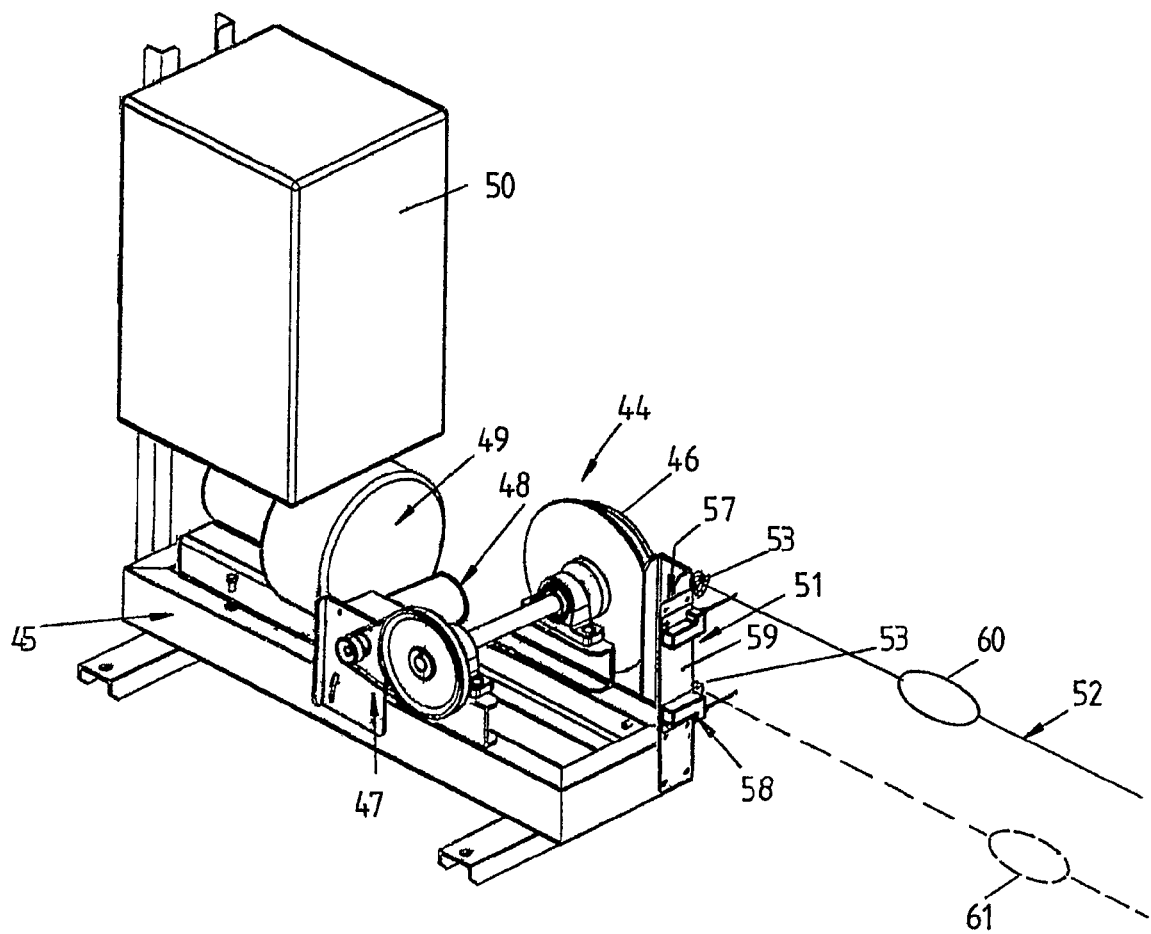
FIG. 10 illustrates a winch assembly for used in the system of FIG. 9.
Figure 11:
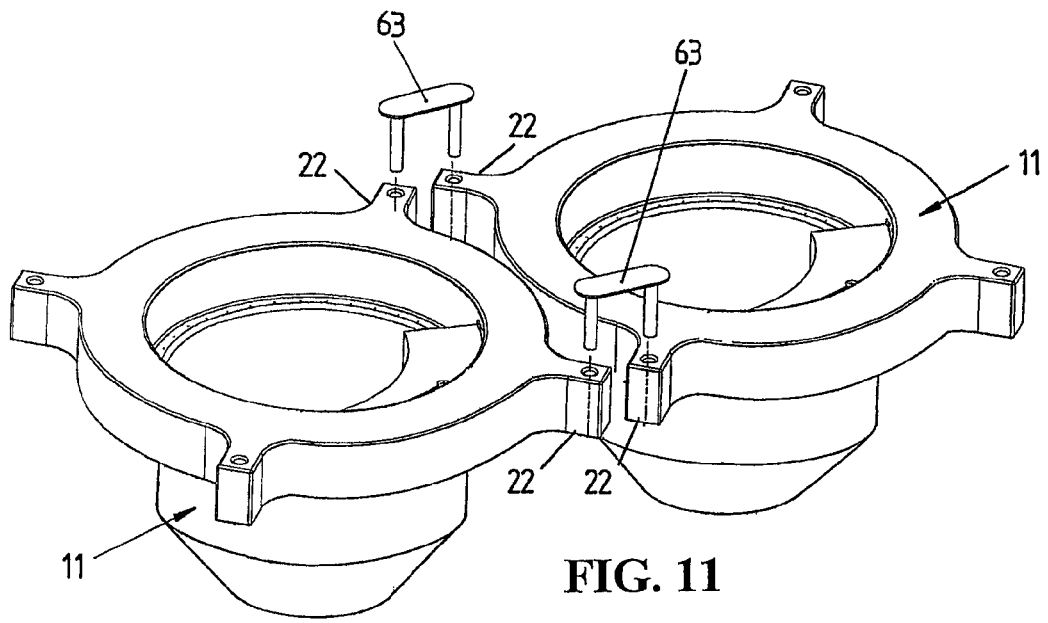
FIG. 11 illustrates the manner in which a pair of adjacent collectors may be interconnected.

For increased efficiency of operation, a ganged series of sludge harvesters 10 may be joined in a side by side configuration as illustrated in dotted outline in FIG. 10 to allow an increased area of the floor of the pond to be traversed. Thus as shown in FIG. 11, a series of collectors 11 of respective harvesters 10 may be connected in a side by side relationship through the lugs 22 using connecting links 63. Alternatively, more than one collector 11 may be connected to a single suction head assembly 12 with respective uptake pipes 26 from the suction head 23 connected to respective collectors 11.

Figure 12:
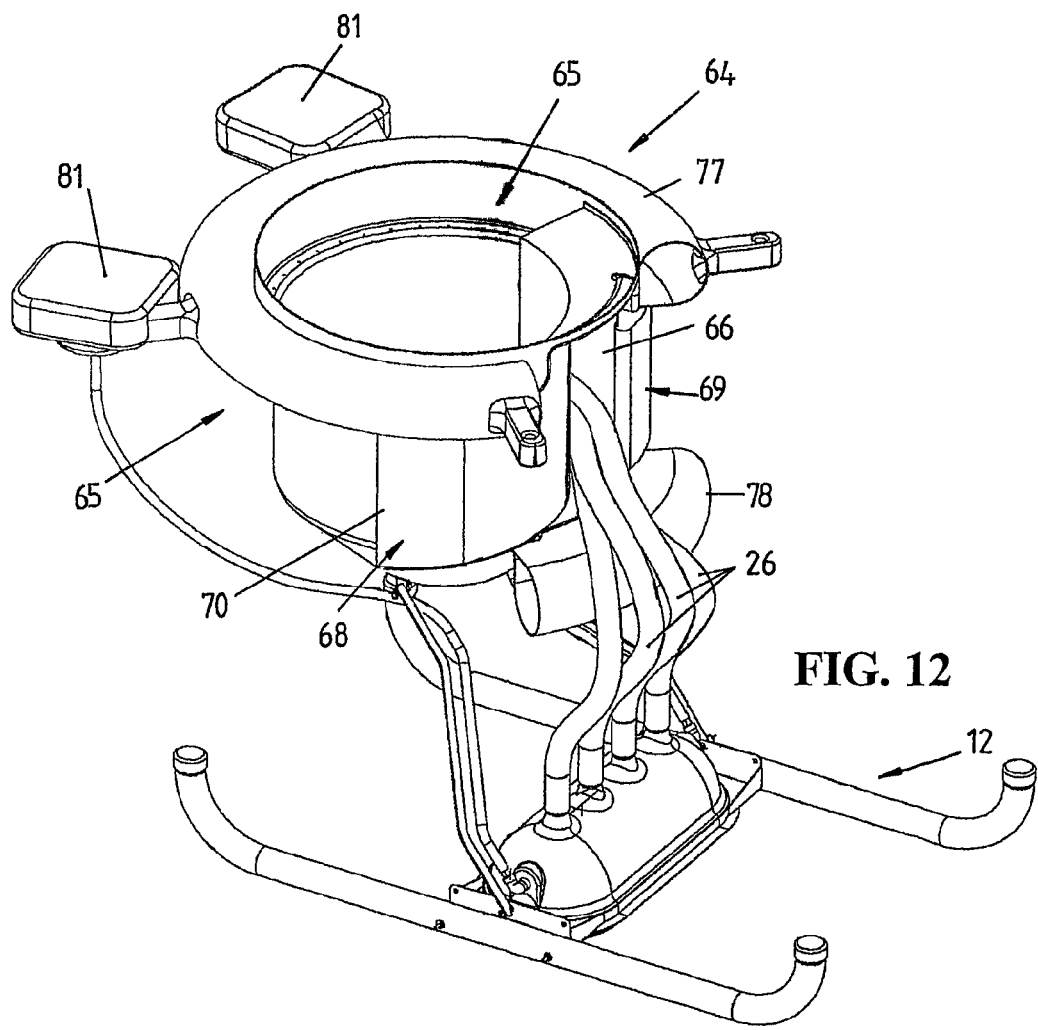
FIG. 12 is a perspective view of a solids collection/separation apparatus according to another aspect of the invention.
Figure 14:
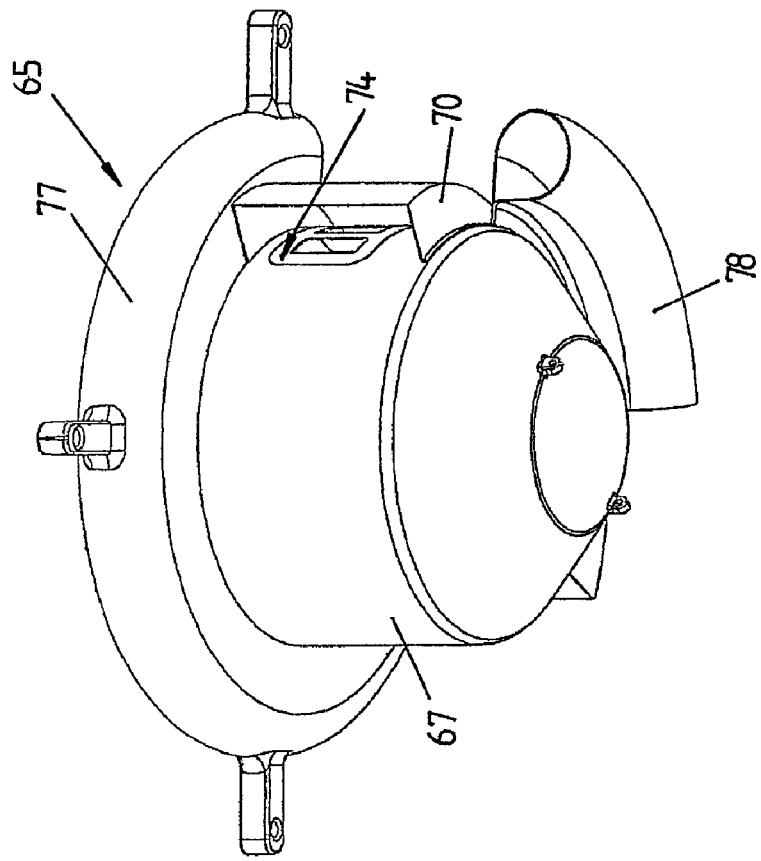
FIGS. 13 and 14 are opposite views of the collector/separator of the apparatus of FIG. 12.
Figure 13:
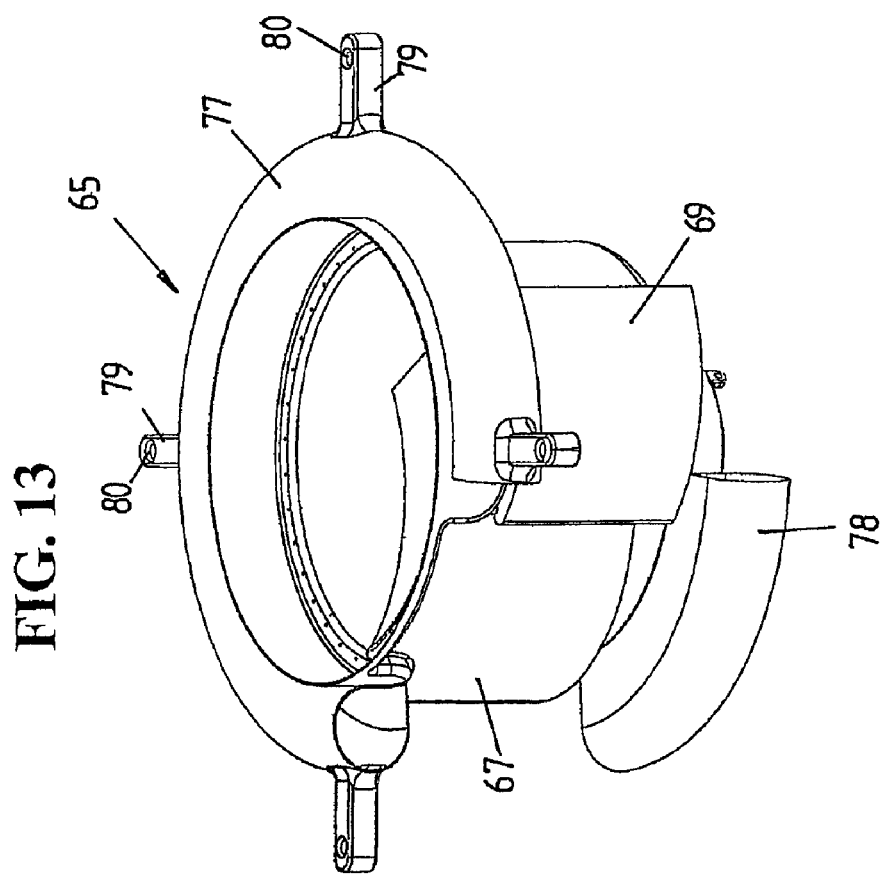

Referring now to FIG. 12, there is illustrated a solids collection apparatus 64 according to a further embodiment of the invention designed for collection of both materials such as sludge on the bottom of a reservoir and also floating solids and/or scum on the surface of the liquid. The apparatus 64 is similar in configuration to the apparatus 10 described above however in this case, the collector 65 which is of similar configuration to the collector 11 has an entry port 66 which is of an elongated rectangular configuration and extends in a generally circumferential direction, in this case 45° around the side wall 67 of the collector 65. Guide members or scoops 68 and 69 are provided at opposite sides of the entry port 66 to assist in directing liquid carrying solids to be collected or separated into the interior of the collector 65.

Figure 17:
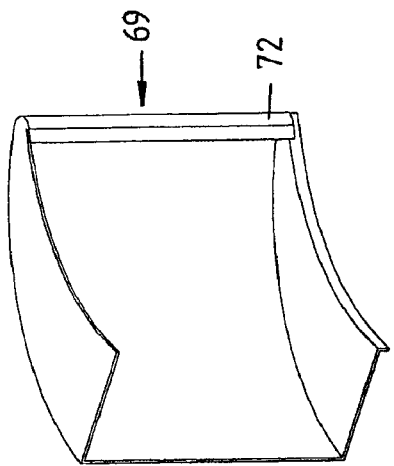
FIG. 17 illustrates the guide at the trailing side of the vessel inlet.
Figure 16:
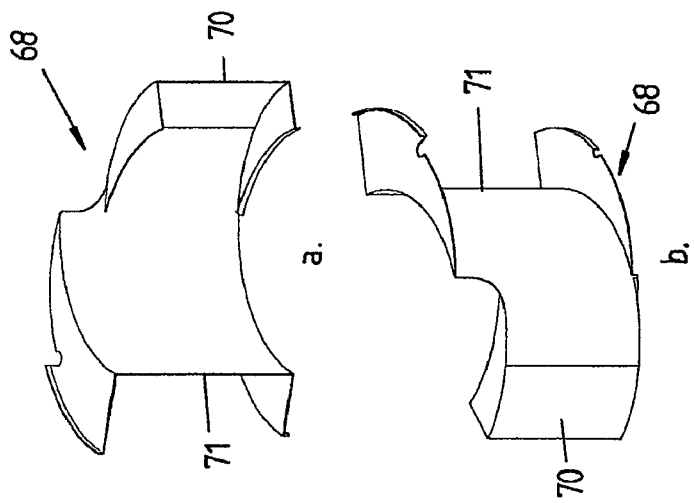
FIGS. 16(*a*) and (*b*) are opposite views of the guide at the leading side of the separator vessel inlet port.
Figure 15:
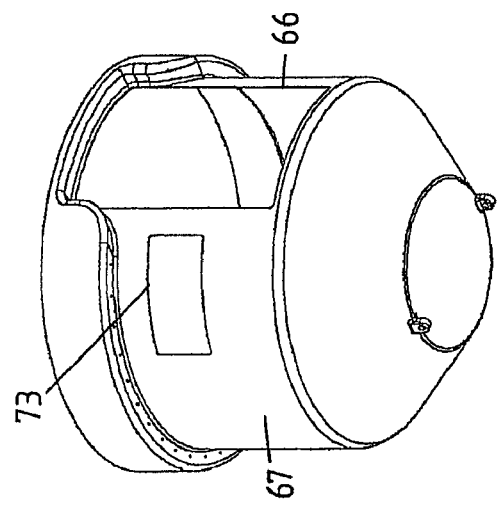
FIG. 15 is a perspective view from the underside of a vessel or housing of the collector/separator of FIGS. 13 and 14.

The guide member 68 as shown more clearly in FIG. 16 comprises a curved baffle which when installed has a portion 70 which curves outwardly from the entry port 66 such that liquid is directed in a generally tangential direction into the interior of the collector 65. The guide member 68 also has a portion 71 co-extensive with the portion 70 which extends inwardly of the port 66 to assist in guiding liquids flowing into the collector 65 through the port 66 in a circular direction and around the interior of the collector 65. The other guide member or scoop 69 as shown in FIG. 17 has a leading hooked portion 72 which hooks about the trailing edge of the port 66 and curves outwardly and rearwardly therefrom on the outside of the collector 65 to assist in aerodynamic flow of liquid past the port 66. The guide members or scoops 68 and 69 thus define a throat for entry of liquid into the port 66. The guide members or scoops 68 and 69 however may of course be of configurations other than that illustrated.

Figure 18:
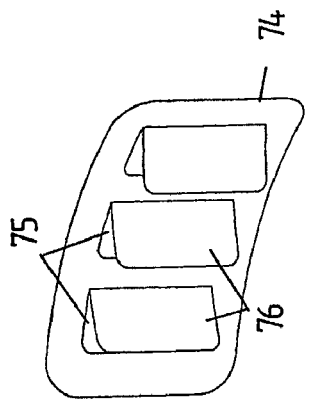
FIG. 18 illustrates the outlet member of the collector/separator of FIGS. 13 and 14.

The wall 67 of the collector 65 is also provided with an outlet opening 73 at a position spaced circumferentially from the entry port 66 and located beneath the portion 70 of the guide member 68 when the latter is installed. The guide member 68 however directs liquid entering the port 66 away from the outlet opening 73 to prevent disruption of the continuous directional movement of the liquid within the collector 65. A plate 74 (see FIG. 18) having series of openings 75 therein defined by inwardly directed flaps 76 bent out of the plate 74 is mountable to the side wall 67 over the outlet opening 73 such that the flaps 76 extend into the collector 65. The flaps 76 serve to direct the liquid circumferentially within the collector 65 whilst the openings 75 act as exits for liquid from the collector 65. The openings 75 may be of different configurations and position depending upon from what level liquids are to exit from the collector 65. The openings 75 may also be adjustable in size and further the flaps 76 may be adjustable or movable. The plates 74 containing the openings 75 and flaps 76 may be interchangeable with other plates having openings and flaps of different configurations depending upon requirements.

So that the collector 65 can float on or adjacent the surface of liquid in which it is operating and from which solids are to be separated, an elongated curved upper hollow float member 77 extends part way around the collector 65 and terminates at opposite sides of the entry port 66. A further elongated curved hollow float member 78 is fixed to the collector 11 beneath the entry port 66 to provide buoyant support in the region where the upper float member 77 is absent. The float members 77 and 78 can serve as air reservoirs and which for this purpose are sealed or closed at each end. Alternatively, one or more buoyant bodies such as foam plastics members or inserts such as members or inserts of tubular configuration may be located in the hollow members 77 and 78. In an alternative arrangement, a buoyant foam plastics material may be injected into the hollow members 77 and 78. The buoyant support provided by the float members 77 and 78 will support the collector 65 in a substantially horizontal attitude at or adjacent the surface of the liquid and with the central axis of the collector 65 substantially vertical.

The collector 65 in this embodiment is further provided with a four radially extending arms 79 which extend from the upper float member 77 for facilitating connection between adjacent collectors 65 or for mooring the apparatus 64 at a desired location. For this purpose, the free ends of the arms 79 are apertured at 80 to enable interconnection of arms 79 of adjacent apparatuses 64 by suitable connectors links (as described with reference to FIG. 11) or for the receipt of anchoring stakes which are driven through apertures 80 and into the floor of the reservoir in which the apparatus 64 is located.

In use, the apparatus 64 is positioned in the path of flow of liquid such that liquid carrying solids to be separated therefrom will flow into the entry port 66 with the guidance of the guiding members 68 and 69. Stakes may be driven through the apertures 80 into the bottom of the liquid reservoir to anchor the apparatus 64 in the desired position. Alternatively, the apparatus 64 may be anchored or positioned by means of mooring lines, anchors or other restraining means. Where the apparatus 64 is arranged within an aquaculture pond, it may be positioned in the path of liquid flow created for example by a rotating paddle wheel type aerator as commonly used in aquaculture.

Liquid being directed into the entry port 66 will flow into the interior of the collector 65 undergoing a circular motion around the internal periphery of the collector 65. Solids entrained in the liquid will tend to be concentrated and settle downwardly and inwardly towards the sump of the collector 65. Liquid flowing into the port 66 after passing around the interior of the collector 66 will then escape through the outlet openings 75.

At regular intervals, collected and concentrated solids in the sump of the collector 65 may be removed by use of a sludge pump which is positioned, or which has an inlet placed, within the sump. This task may be simply undertaken by persons on a boat or other watercraft which can approach the collector 65 floating on the surface of the liquid to enable for cleaning and collection of solids therefrom.

In another arrangement, the apparatus 64 may be moved to the bank of the pond or other body of liquid in which the apparatus 64 is operating to permit removal of the collected solids by a land based sludge pump for example a pump carried by a tractor and/or trailer or other vehicle which may be moved to an appropriate position on the pond bank. Solids removed from the apparatuses 64 may be then taken away by the tractor and/or trailer or other vehicle.

A series of individual separation apparatuses 64 may be arranged at any position where separation of solids from liquids is required. Apparatuses 64 may be arranged in a straight line in a linear array with the apparatuses 64 interconnected by the arms 79 on opposite sides and by means of the connecting links in a similar manner to that shown in FIG. 11. The connected apparatuses 64 are arranged such that the entry ports 66 are all located on a common side. The array may extend transversely to the direction of liquid flow such that the spaced entry ports 66 all intercept the flowing liquid which is directed into each apparatus 64 for separation of solids as before.

Apparatuses 64 may also be interconnected in a square array again by the arms 79 with inlet ports 66 being arranged on opposite sides of the array for receiving liquid flowing in opposite directions towards the array. This configuration is particularly suited for use in tidal situations where flow of liquid reverses and such that the array can collect solids and other materials both on incoming tidal flow and outgoing tidal flow. Of course, the apparatuses 64 may be connected together in many different arrays other than those described above.

The apparatuses 10 and 64 described above may be used in many different applications where solids are required to be separated in situ or in field locations such as in mining, chemical treatment, manufacturing, or abattoir effluent ponds, agricultural applications such as piggeries, dairies, poultry farms and animal feed lots as well as for maintenance of the health of recreational ponds or lakes at golf course, council parks, and residential canal developments.

Deflector arms may be used in association with the separation apparatus 64 for assisting in directing liquids and solids carried thereby towards the separation apparatus 64. The deflector arms may be formed of a buoyant material or include air chambers or hollow chambers which may be injected with buoyant foam plastics material or may carry inserted buoyant foam plastics sections or other buoyant materials or bodies to enable the arms to float or be located adjacent the surface of the liquid. Alternatively, separate floats may be attached to the arms for this purpose. Opposite ends of the arms may be provided with apertures to enable connection of the arms at one end to the arms 79 of the separation apparatus 64 by suitable connectors provided through the apertures for example locking pins. The arms may be angled as desired relative to each other and the separation apparatus 64 for directing liquids towards the entry port 66 of the apparatus 64. The arms thus are arranged to define an enlarged throat. This may be extended by connecting further similar arms to the arms.

For collection of sludge or other materials settling on the floor of the pond, the apparatus 64 may also be associated with a suction head assembly 12 as the same type as described with reference to FIGS. 1 and 6 to 8. The uptake pipes 26 at their upper end in this case extend into the intake port 66 of the apparatus 64 whilst a portion of the intake port 66 remains clear for collecting of floating solids or scum. Air may be applied to the suction head assembly 12 by a shore mounted blower or compressor as described previously. Alternatively, the suction head assembly 12 may be supplied with air from air pumps 81 mounted on the collectors 65, the air pumps 81 being for example electrically operated pumps supplied with current by electrical cables from the shore. The apparatus 64 is most suitably used by being moved around the body of liquid in which it is operating for example in the same manner as described with reference to FIG. 9.

As the apparatus 64 is moved along or across the pond, sludge on the floor of the pond will be drawn upwardly along the uptake pipes 26 under the influence of the air supplied to the air diffuser pipe 37 to collect within the collector 65 where it is concentrated at the center of the collector 65. At the same time, the collector 65 is moved over the surface of the water of the pond to collect solids on or near the surface of the water.

At regular intervals, the apparatus 64 may be moved to either bank of the pond to allow removal of the sludge and other solids or materials concentrating in the collector 64.

Whilst the suction head assembly 12 has been described in connection with the collectors 11 or 64, it may be used with any other form of separation apparatus. Alternatively, the suction head assembly 12 may be used independently. Further other arrangements may be provided for moving the apparatus 10 or 64 in or on a body of water.

The components of the apparatus 10 and 64 are preferably formed of plastics materials but may be formed of metal suitably a non-corrosive metal. The dimensions of the main housing may be scaled up or down to address water volume, flow rates and depth. Water entry or exit points may be modified to allow for different water flow directions, volumes and flow rates. The depth and position of the outlet port 73 may also be adjusted in accordance with the types of solids, floating or settling, to maximise retention of solids. Thus with floating solids, the port 73 may be lowered so that the solids are retained within the collectors 11 and 65 whilst with settling solids, the port 73 may be raised. Mooring points may be redesigned to allow better anchoring or joining of other units for form multiple connected units.

Flotation of the device may require alterations to allow adjustment of in-water height levels or increased volume to allow persons to access central regions for maintenance or servicing. The float members 21, 77 and 78 may be replaced by separate floatation elements such as foam blocks or alternatively, the collectors 11 or 65 may be supported on floating rafts or other buoyant body. Buoyant chambers may also be formed as part of the collectors for example by being integrally formed with the collectors.

In a further arrangement for creating a suction pressure in the suction head, the uptake pipes 26 from the suction head 23 may be connected to a suction pump. The suction pump may be mounted on a collector 11 or 65 where used or alternatively the uptake pipes 26 may be connected to a suction pump arranged on the land or shore line around a liquid reservoir to pump sludge or the like to the land.

The apparatus of the invention is lightweight, corrosion resistant and non-toxic and not polluting. The apparatus may be made from recycled plastics and colour coded for a variety of applications for descriptive requirements. The separation apparatus is of modular form and may be stackable for ease of handling or freighting purposes. The apparatus may be easily replicated for mass production for example by moulding the housing and suction head from plastics such as in a rotational moulding process. The apparatus is easily transportable and relocatable for use at different locations with ease of set-op, operate, break down and removal for time/labour requirements. The material of the apparatus may be selected for use with toxic or corrosive liquids.

Whilst the above has been given by way of illustrative embodiment of the invention, all such variations and modifications thereto as would be apparent to persons skilled in the art are deemed to fall within the broad scope and ambit of the invention as herein defined in the appended claims.

The invention claimed is:

1. Apparatus for collecting solids settling at the bottom of a liquid reservoir, said apparatus comprising
    a hollow suction head, said suction head comprising a hollow body having an upper side and a lower side, said lower side defining a mouth,
    at least one outlet duct extending from said hollow suction head,
    a collector communicating with said at least one outlet duct for collecting materials from said suction head, said collector comprising a housing defining a collection chamber of substantially circular cross-section and buoyant support means for providing buoyant support to said housing, said housing including at least one entry port through which liquids and solids entrained in said liquid can flow from said suction head into the chamber via said at least one outlet duct,
    means for introducing air into said suction head to create a suction pressure in said suction head to cause in use liquid and solids adjacent said mouth to pass along said at least one outlet duct into said at least one entry port for collection in said chamber, and there being
    guide means in said chamber adjacent said entry port for directing liquids and entrained solids from said outlet duct in a generally tangential direction into said chamber.

2. Apparatus as claimed in claim 1 wherein said suction head is of domed shape and includes on said upper side one or more outlets for connection to said outlet duct or ducts.

3. Apparatus as claimed in claim 1 wherein said means for introducing air into the suction head comprises an air diffuser located within the said suction head.

4. Apparatus as claimed in claim 1 wherein said suction head includes means to displace solids from the bottom of the liquid reservoir.

5. Apparatus as claimed in claim 1 and including skids at opposite ends of said suction head for supporting said suction head.

6. Apparatus as claimed in claim 1 and including one or more outlet ports or openings in said housing spaced from said entry port for passage of liquid out of the chamber.

7. Apparatus as claimed in claim 1 wherein the collector housing has an upper periphery and wherein said buoyant support means comprise a buoyancy member located around at least portion of said upper periphery.

8. Apparatus as claimed in claim 7 wherein said buoyancy member comprises a hollow chamber for containing air or one or more buoyant bodies.

9. A method of cleaning a liquid reservoir, said method including the steps of
    providing apparatus comprising a hollow suction head adapted to collect solids settling at the bottom of a liquid reservoir, said suction head having an upper side and a lower side, said lower side defining a mouth, at least one outlet duct extending from said hollow suction head, and a collector for receiving and collecting materials from said suction head via said at least one outlet duct, said collector further including means for collecting materials at or adjacent the surface of liquid in said reservoir, and means for buoyantly supporting said collector at or adjacent the surface level of liquid in said reservoir,
    introducing air into said suction head to create a suction pressure in said suction head to cause settling solids adjacent said mouth to pass along said at least one outlet duct to said collector, and
    moving said apparatus in said reservoir whereby settling solids and solids floating in or adjacent the surface of liquid in the reservoir may be collected simultaneously.

10. Apparatus for collecting solids settling at the bottom of a liquid reservoir, said apparatus comprising
    a suction head assembly including a hollow suction head and skids at opposite ends of said suction head, said suction head comprising a hollow body having an upper side and a lower side, said lower side defining a mouth,
    at least one outlet duct extending from said hollow suction head,
    a collector communicating with said at least one outlet duct for collecting materials from said suction head, said collector comprising a housing defining a collection chamber and buoyant support means for providing buoyant support to said housing,
    a pair of link arms extending substantially parallel to each other and pivotally connected at opposite ends to said suction head assembly and said collector respectively, said link arms permitting the height of said suction head to adjust relative to said collector, and
    means for introducing air into said suction head to create a suction pressure in said suction head to cause in use liquid and solids adjacent said mouth to pass along said at least one outlet duct for collection in said collector.

11. Apparatus as claimed in claim 10 and including a winch and a cable coupled to said apparatus for moving the apparatus in the liquid reservoir, and means for reversing said winch whereby said apparatus can traverse in opposite directions in the liquid reservoir.

12. Apparatus as claimed in claim 11 wherein said cable includes stop means adapted to cooperate with one or more switch means for reversing said winch.

13. Apparatus for collecting solids settling at the bottom of a liquid reservoir, said apparatus comprising
    a hollow suction head, said suction head comprising a hollow body having an upper side and a lower side, said lower side defining a mouth,
    at least one outlet duct extending from said hollow suction head, a collector communicating with said at least one outlet duct for collecting materials from said suction head, said collector comprising a housing defining a collection chamber and buoyant support means for providing buoyant support to said housing, link means interconnecting said suction head and said collector, said link means permitting the height of said suction head to adjust relative to said collector, means for introducing air into said suction head to create a suction pressure in said suction head to cause in use liquid and solids adjacent said mouth to pass along said at least one outlet duct for collection in said collector, and a winch and cable coupled to said apparatus for moving the apparatus in the liquid reservoir, and means for reversing said winch whereby said apparatus can traverse in opposite directions in the liquid reservoir.

14. Apparatus as claimed in claim 13 wherein said reversing means includes stop means associated with said cable, said stop means being cooperable with one or more limit switches for causing automatic reversing of said winch.

15. Apparatus for collecting solids settling at the bottom of a liquid reservoir, said apparatus comprising a suction head assembly including a suction head and skids which support said suction head for movement over a floor surface of the reservoir, said suction head comprising an elongated hollow body having an upper side and a lower side, said lower side defining a mouth, at least one outlet duct extending from said hollow suction head, a floating collector comprising a housing defining a collection chamber and buoyant means for buoyantly supporting said housing adjacent the surface of liquid in the reservoir, said housing including at least one entry port communicating with said at least one outlet duct, means for introducing air into said suction head to create a suction pressure in said suction head to cause in use liquid and solids adjacent said mouth of said suction head to pass along said at least one outlet duct into said at least one entry port for collection in said collection chamber of said collector, pivotal link means interconnecting said collector and suction head assembly, and means for moving said apparatus in said liquid reservoir, said pivotal link means permitting the height of said suction head to vary relative to said collector when following the floor surface of said reservoir upon movement of said apparatus in said reservoir.

16. Apparatus as claimed in claim 15 wherein said pivotal link means comprise a pair of spaced link arms extending substantially parallel to each other and pivotally connected at opposite ends to said suction head assembly and said collector respectively.

17. Apparatus as claimed in claim 15 wherein said moving means comprises a winch and including means for automatically reversing the operation of said winch to enable the apparatus to traverse in opposite directions in said reservoir.

18. Apparatus as claimed in claim 17 wherein said moving means includes a cable coupled to said winch and said collector or said suction head assembly and stop means on said cable adapted to cooperate with one or more switch means for reversing said winch.

19. Apparatus as claimed in claim 15 wherein collector housing has an upper periphery surrounding an upper open end of said housing and wherein said buoyant support means comprise a buoyancy member located around at least portion of said upper periphery.

20. Apparatus as claimed in claim 15 wherein said chamber includes a lower frustoconical sump.

* * * * *